United States Patent
Baillot

(10) Patent No.: US 8,296,063 B1
(45) Date of Patent: Oct. 23, 2012

(54) EMERGENCY RESCUE SYSTEM AND METHOD HAVING VIDEO AND IMU DATA SYNCHRONIZATION

(75) Inventor: Yohan Baillot, Reston, VA (US)

(73) Assignee: Exelis Inc., McLean, VA (US)

( * ) Notice: Subject to any disclaimer, the term of this patent is extended or adjusted under 35 U.S.C. 154(b) by 740 days.

(21) Appl. No.: 12/434,899

(22) Filed: May 4, 2009

(51) Int. Cl.
*G01C 21/34* (2006.01)

(52) U.S. Cl. ......... 701/434; 701/433; 701/439; 701/454

(58) Field of Classification Search ............. 361/679.03; 701/213, 2, 212, 434, 433, 439, 454; 340/539.13; 36/136; 600/587, 594
See application file for complete search history.

(56) References Cited

U.S. PATENT DOCUMENTS

| | | | |
|---|---|---|---|
| 6,522,531 B1 * | 2/2003 | Quintana et al. | 361/679.03 |
| 2002/0072881 A1 | 6/2002 | Saitta | |
| 2002/0091482 A1 | 7/2002 | Eakle, Jr. et al. | |
| 2005/0033200 A1 * | 2/2005 | Soehren et al. | 600/595 |
| 2007/0038152 A1 * | 2/2007 | Sarvazyan et al. | 600/587 |
| 2008/0040951 A1 * | 2/2008 | Kates | 36/136 |
| 2009/0037033 A1 * | 2/2009 | Phillips et al. | 701/2 |
| 2009/0043504 A1 * | 2/2009 | Bandyopadhyay et al. | 701/213 |
| 2009/0051768 A1 | 2/2009 | DeKeyser | |
| 2009/0079559 A1 * | 3/2009 | Dishongh et al. | 340/539.13 |
| 2010/0017124 A1 * | 1/2010 | Zhao et al. | 701/212 |

* cited by examiner

*Primary Examiner* — Le H Luu
(74) *Attorney, Agent, or Firm* — Edell, Shapiro & Finnan, LLC

(57) ABSTRACT

Systems and methods for collecting and recording video data and inertial motion unit (IMU) data associated with the video data representative of a path of traversal, transmitting the video data and IMU data associated with the video data to a rescue device that includes a display, and subsequently replaying the video data on the display of the rescue device along with viewable indicia, based on the IMU data associated with the video data, that is indicative of the motion of a user when the video data was collected and recorded.

24 Claims, 4 Drawing Sheets

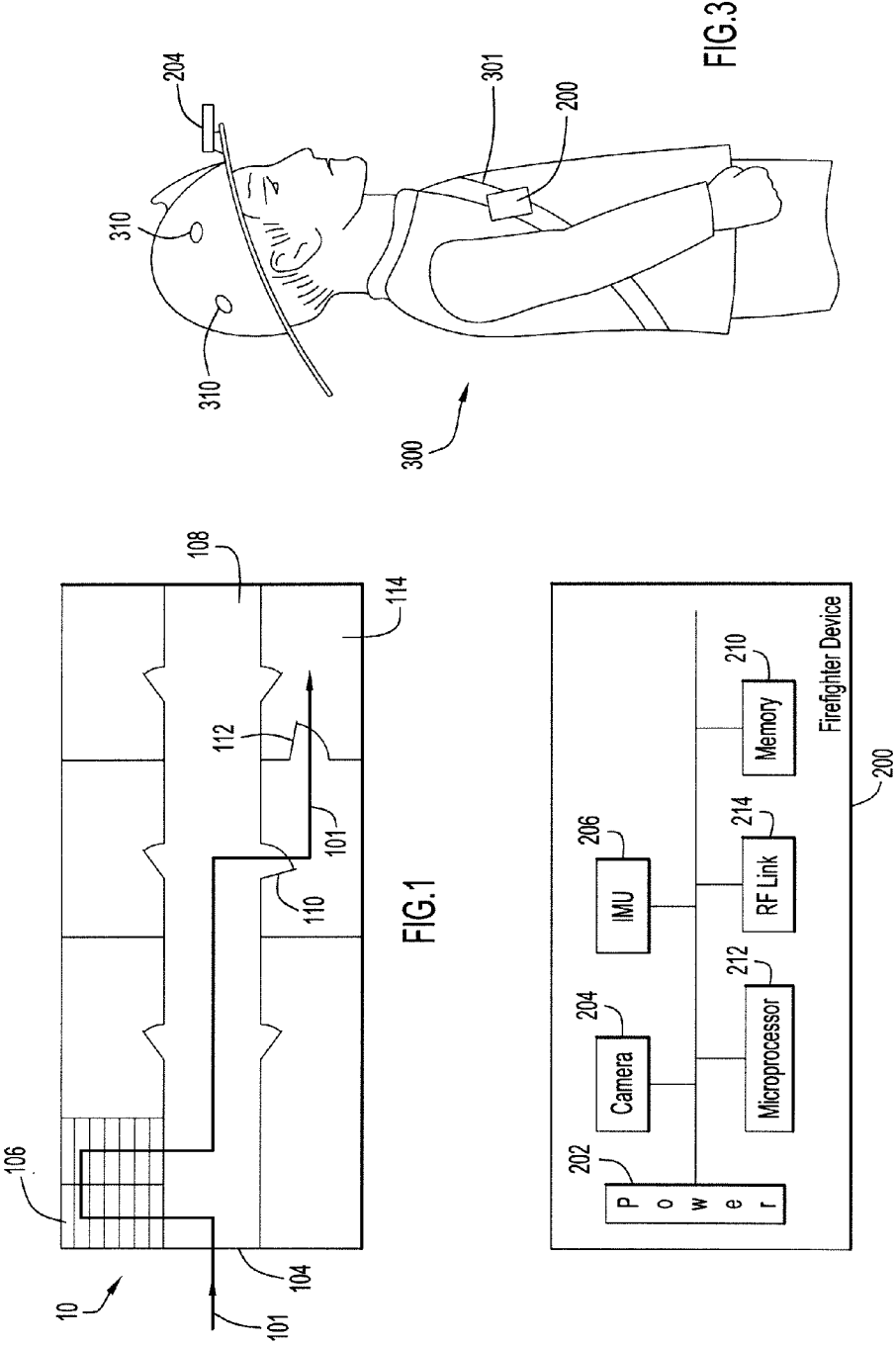

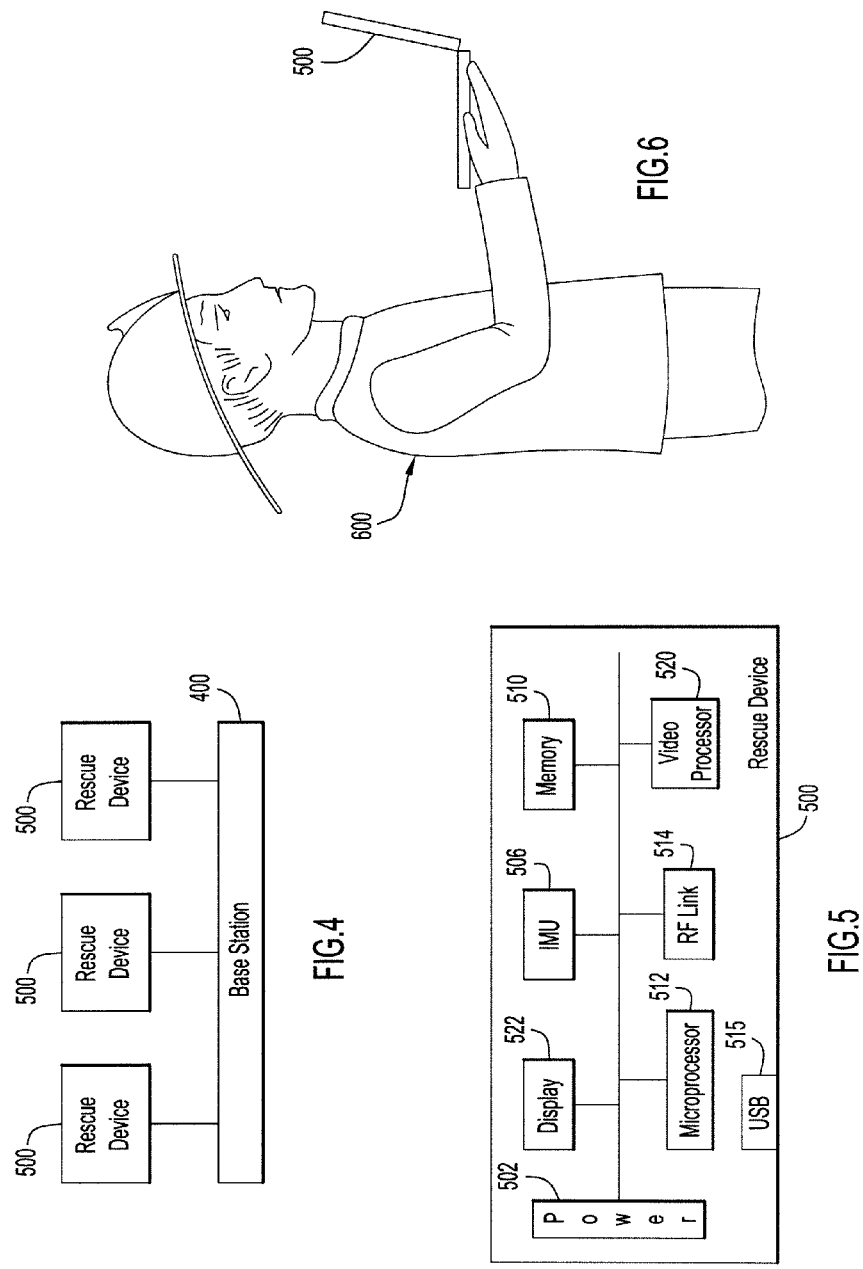

EMERGENCY RESCUE SYSTEM AND METHOD HAVING VIDEO AND IMU DATA SYNCHRONIZATION

FIELD OF THE INVENTION

Embodiments of the present invention are related to systems and methods for personnel rescue, and particularly to locating personnel via traversal path retracing.

BACKGROUND OF THE INVENTION

Firefighters and other rescue workers often put themselves in harm's way. A firefighter may enter a burning building, filled with smoke and falling debris, and make his way through various rooms, hallways, stairwells, etc., in an effort to find a source of smoke or fire, to locate possible victims, and/or to secure a given area. Unfortunately, as a result of the dangerous environment, including fumes, heat, sharp objects, it is not too uncommon for a firefighter to be injured and or incapacitated in the course of his work. When this occurs, it is imperative that the firefighter be quickly located and evacuated from the area for treatment. However, in the event the firefighter (or other personnel) is, e.g., working alone, and an incapacitating injury occurs, or the firefighter simple wants assistance with whatever the task at hand might be, it is necessary for others to know where the firefighter can be found so that a rescue team or other assistance can be dispatched to that location. It is critical for a rescue team to know at least the specific floor and better if possible the specific room where a downed firefighter can be found so that rescue can be done quickly before he or she runs out of oxygen.

U.S. Pat. No. 6,898,559 to Saitta discloses a system for dynamic and automatic building mapping in which a tracker module is carried by a user and an optional command module which, together, operate to automatically map the rooms of a building as a user traverses the rooms of the building. The tracker module includes a transducer system that determines the present distance from the user to each of the walls of the room, the location of openings in the walls as well as an inertial guidance system that precisely locates the user with respect to a known reference point. The data produced by the tracker module of the automatic building mapping system can be transmitted to a centrally located command module so that multiple units can simultaneously be tracked and a mapping of the building effected from different perspectives to thereby create an accurate composite layout map. In addition, the user can receive a heads-up display to enable the user to visualize the layout of the building as the user traverses the various rooms of the building, and as concurrently mapped by other users in the building. In this way, an accurate virtual map of a given building can be created on demand by users moving through the rooms of the building. While the system disclosed in the foregoing patent may have certain advantages, it is relatively complicated to implement. Moreover, for purposes of locating an individual in a rapid and efficient manner, the system disclosed by Siatta may not be the most appropriate.

In another related technology, U.S. Patent Publication No. 2009/0051768 A1 to DeKeyser discloses loop recording with book marking where recorded data can be transmitted wirelessly to another location. However, such a system is not necessarily suitable for rescue operations of the type noted above.

Accordingly, other systems and methods for locating personnel are desired.

SUMMARY OF THE INVENTION

Embodiments of the present invention provide a rescue apparatus that includes a user device configured to collect and transmit video data and inertial motion unit (IMU) data associated with the video data, and a rescue device configured to receive the video data and IMU data associated with the video data transmitted by the user device, to play the video data on a display, and further configured to present viewable indicia, based on the IMU data associated with the video data, that is indicative of the motion of a user when the video data was collected by the user device.

More specifically, in accordance with one embodiment of the invention, a firefighter (or other person/user) carries a user or "firefighter" device that includes a camera and an IMU. The camera is preferably mounted on the user's helmet in a forward looking direction to capture what the firefighter is seeing. As video data is being collected by the camera, the IMU generates direction, speed, tilt, and/or acceleration data that is indicative of the orientation and/or movement of the firefighter. In one embodiment, the IMU also incorporates ultrasonic sensors that can be used to detect, among other things, when the firefighter passes through a small passage, such as a doorway.

The video data and IMU data associated with the video data are streamed/transmitted to the rescue device (or first to a base station) that may be a handheld computer or wrist-mounted device. During a rescue mission, the video data is replayed on the rescue device along with indicia based on the IMU data associated with the video data, as well as, possibly, real-time IMU data generated with respect to the rescuer who is operating the rescue device.

Thus, for example, the rescue device might superimpose a direction arrow on the video imagery by using IMU data recorded at that time, or indicate that a doorway was passed through, or how much time has elapsed for the video along with the actual time the rescuer has been moving.

Ultimately, by watching the video and being further prompted by one or more indicia superimposed on the video being displayed, a rescuer may be able to more easily retrace the path of the firefighter and thus locate him.

These and other features of the several embodiments of the invention along with their attendant advantages will be more fully appreciated upon a reading of the following detailed description in conjunction with the associated drawings.

BRIEF DESCRIPTION OF THE DRAWINGS

FIG. 1 shows a plan view of a building along with a traversal path.

FIG. 2 depicts a firefighter device in accordance with an embodiment of the present invention.

FIG. 3 depicts a firefighter carrying the firefighter device in accordance with an embodiment of the invention.

FIG. 4 shows a configuration including several rescue devices in communication with a base station in accordance with an embodiment of the present invention.

FIG. 5 depicts a rescue device in accordance with an embodiment of the present invention.

FIG. 6 shows a rescuer carrying the rescue device in accordance with the present invention.

DETAILED DESCRIPTION

Figure 7:
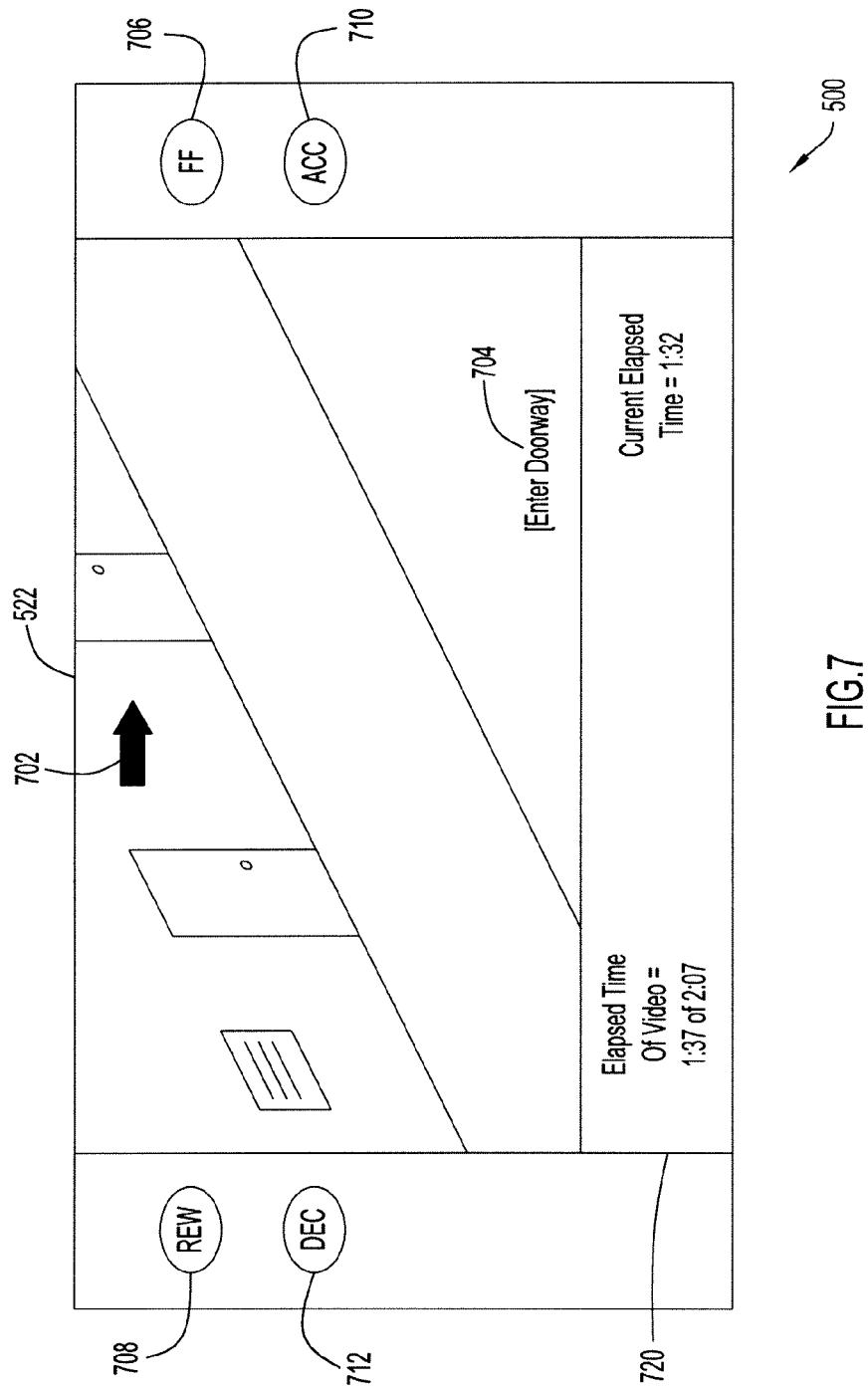
FIG. 7 shows an example display of the rescue device in accordance with an embodiment of the present invention.

Referring first to FIG. 1, there is shown a plan view of a building 10 along with a traversal path 101 that a firefighter might take. As shown, traversal path 101 begins outside of building 10, passes through an entryway 104, follows a stairwell 106 (e.g., up one floor), passes down a hallway 108, through a first door 110 and then a second door 112, arriving in room 114. It is at this location that a firefighter (or other person) may be in need of assistance, but for unknown reasons, is unable to describe to others where his location actually is. For example, it may be the case that the firefighter is disoriented, and simply cannot remember the route that he took to arrive in room 114. Perhaps, also, the route that was taken was full of smoke and, as a result, the firefighter cannot describe the route because it could not be seen very well. It may also be the case the firefighter has become incapacitated and is, therefore, unable to provide any information to a rescue party.

Rescue parties often rely on global positioning system (GPS) coordinates to locate missing people or people in need of assistance. While this technology works very well outdoors, GPS signals often do not penetrate buildings, and thus may be ineffective for helping to locate someone indoors.

Thus, a goal of embodiments of the present invention is to facilitate locating a person, such as a firefighter, without already knowing their precise location.

Embodiments of the present invention comprise two main components: a firefighter device and a rescue device. Those skilled in the art will appreciate that these two main components may each be comprised of two or more sub-components, and that the number of sub-components is a matter of design.

FIG. 2 depicts a firefighter device 200 in accordance with an embodiment of the present invention. Firefighter device 200 includes a power supply 202, a camera 204, an inertial motion unit (IMU) 206, memory 210, microprocessor 212 and radio frequency (RF) link 214, all connected via communication and/or power bus 220, as shown. Power supply 202 can be any battery, preferably rechargeable. Power supply 202 could also be made available via another device carried by the firefighter 300 (FIG. 3), such as a radio or other computing device.

Camera 204 is preferably a digital camera that can be controlled to capture images at a predetermined frame rate and is preferably attached to a helmet 302 of firefighter 300 and is preferably oriented forward. Camera 204 may be physically wired to other components of the firefighter device 200, or may operate in a wireless fashion.

IMU (Inertial Motion Unit) 206, in accordance with an embodiment of the present invention, can be considered an "umbrella" term that may represent one or several different devices whose data can be collected separately, and/or whose data can be collected and then combined to provide pre-calculated information. More specifically, IMU 206 may comprise any one or more of a gyroscope, accelerometer, compass, tilt sensor (not shown), ultrasonic sensors 310, as well as other sensors or detectors and that may be appropriate for a given situation. These sensors and devices are well-known to those skilled in the art. Such sensors capture the motion acceleration (in both orientation and position). By integrating provided readings, the speed/velocity of the firefighter's motion can be obtained. The speed, orientation and position is recorded to indicate on the rescue device the direction of motion which can be indicated as an arrow (is the user going forward, backward, left, right, turning left or right, etc.). As shown in FIG. 3, the firefighter 300 may wear the firefighter device 200 using, e.g., a shoulder strap 301, or the firefighter device 200 could be placed in a pocket or in a backpack worn by the firefighter 300. In a preferred implementation, the firefighter device 200 is attached to an existing vest, belt, or oxygen bottle so as to avoid adding an entirely new device that could get in the way of a firefighter.

A gyroscope (one, two or three axis), if part of IMU 206, could thus report the orientation of the firefighter with respect to some starting position. An accelerometer (single or multi-axis) can provide information about the changes in direction that the firefighter 300 may take as he follows the path 101 (FIG. 1). A compass may likewise provide direction information with respect to the current direction of motion. Finally, and optionally, one or more ultrasonic sensors 310 could be arranged, e.g., on helmet 302. Such ultrasonic sensors can be used to detect when firefighter 300 passes through a smaller opening such as a doorway.

Microprocessor 212 preferably receives the sensor information from IMU 206 and at least buffers the same in memory 210. In an alternative embodiment, as mentioned, microprocessor 212 may process data received from IMU 206 to generate blended or consolidated information, such as vector (speed and direction) information.

It is noted that memory 210 (e.g., a first-in, first-out (FIFO) device) need only be of sufficient size to store video data and IMU data for a time sufficient to transmit the data to base station 400 (or directly to a rescue (or locating) device 500) or of sufficient size to store data to be transmitted later in case the firefighter is not in range of the base station or the rescue device (note that the firefighter device might not be in range of the base station 400 (see FIG. 4) during the rescue 500, but the rescue device could come into range of the firefighter device 200 as the rescue team advance in the building, and as it comes in range, the rescue device 500 could get data that the base station 400 could not). Of course, memory 210 of firefighter device 200 could also be large enough to store the entirety of the data that is collected during the entirety of a sortie by the firefighter 300.

To save memory usage, in one embodiment, the frame speed of the camera 204 may be linked or tied to the speed of the firefighter 300. The speed of firefighter 300 may be obtained from IMU 206. In any event, generally, a low, fixed frame speed of about one to ten frames/second may be sufficient to provide sufficient video imagery.

Ultimately, selected or all of the IMU data and the video imagery (data) captured by the camera is wirelessly transmitted from firefighter device 200 (via RF link 214) to a base station 400 (FIG. 4) or directly to one or more rescue devices 500 (FIG. 5).

Briefly, FIG. 4 shows an embodiment wherein several rescue devices 500 are physically attached or in communication with a base station 400. In this embodiment, firefighter device 200 communicates with base station 400 and transmits the video data and IMU data that has been collected and buffered in memory 210. Although not shown, base station 400 would also comprise sufficient memory to store the data received from firefighter device 200, or at least sufficient memory to pass the received data to memory 510 of rescue device 500. The base station 400 facilitates loading several rescue devices 500 at the same time. However, those skilled in the art will appreciate that base station 400 is not essential, and data from firefighter device 200 could be passed directly to rescue device(s) 500.

Reference is now made to FIG. 5, which depicts a rescue device in accordance with an embodiment of the present invention. Rescue device is preferably in the form of a tablet computer or wrist-mounted device and comprises a power supply 502, such as a rechargeable battery, and an IMU 506 that includes at least some of the same devices or sensors as IMU 206 of firefighter device 200. Rescue device 500 still further preferably comprises memory 510 and microprocessor 512. The functionality of microprocessor 512 will be explained further below with reference to FIGS. 7 and 8. Rescue device 500 further includes one, or both, of an RF link 514 or a physical connection device such as a universal serial bus (USB) connector 515. If USB connector 515 is used, then any rechargeable battery associated with power supply 502 could be recharged via the USB connector 515.

In addition to the foregoing, rescue device 500 preferably comprises video processor 520 and display 522. Video processor 520 could also be incorporated with microprocessor 512. A general purpose of the rescue device 500 is to obtain the previously recorded video data and IMU data from firefighter device 200 and replay the video imagery on display 522 while trying to retrace the path of the firefighter 300 through building 10. That is, in the case where firefighter 300 traverses a path while capturing video imagery/data and IMU data associated with that video data, and that firefighter 300 becomes incapacitated and/or requires assistance but cannot identify to a rescuer his location, the rescue device 500 can be used by rescuer 600 (FIG. 6) to help retrace the path taken by firefighter 300. As will be explained below, even when the video imagery presented on the display might be missing or difficult to see by the rescuer 600, additional indicia based on the IMU data associated with the video data, as well as real-time IMU data collected with respect to the rescuer 600, can provide sufficient information to the rescuer 600 to enable him to continue along the proper path to reach firefighter 300.

More specifically, FIG. 7 illustrates an example display 522 and additional features of rescue device 500. As shown, display 522 depicts an image of what firefighter 300 might have seen prior to passing through doorway 110 (FIG. 1), with a door on the left, which the firefighter may have looked at momentarily. Overlaid on the image is an arrow 702 (one possible indicia in accordance with an embodiment of the present invention) that indicates that the next direction the firefighter 300 took along his path is to the right, namely through doorway 110. In other words, not only does the rescue device provide playback of the video data taken by firefighter 300, but it enhances that video imagery with additional indicia that assists the rescuer 600 in more quickly retracing the steps of firefighter 300.

Arrow 702 can be superimposed on the display by the video processor 520, operating in conjunction with microprocessor 512, which is configured to operate on the IMU data associated with the video data received from firefighter device 200. That is, the IMU data associated with the video data indicates, among other things, direction of motion/travel with respect to, e.g., the direction of view of the camera 204 (using e.g., gyroscopes, accelerometers, and the like). In this way, the display can indicate to the rescuer 600 what the next step/direction of firefighter 300 was even though the firefighter 300 may have been looking in another direction.

The direction of arrow 702 can also be determined using the real-time IMU data received from IMU 506 of rescue device 500. In this case, the real-time IMU data and the IMU data associated with the video data can be synchronized. For example, both sets of IMU data may contain an indication of direction using a compass heading. When both directions indicate, e.g., north, that means that the rescuer 600 is heading in the same direction as the firefighter 300 was heading. In such a case, the arrow 702 may point straight up signifying to the rescuer 600 that he is still following the direction of the firefighter 300

Another indicia that may be provided in accordance with the present invention is an indication that the firefighter 300 went through a door. Indicia 704 ("ENTER DOORWAY") could be presented as highlighted or flashing text, and could be triggered as a result of the ultrasonic proximity detectors 310 detecting that the firefighter 300 passed through a doorway. Thus, again, the rescue device can be, in effect, "one step ahead" along the path 101 of firefighter 300 by providing additional indicia superimposed or overlaid on the video imagery provided on display 522. In connection with doorway detection, the display 522 could also indicate how many doorways the firefighter 300 went through. Also, if the IMU 506 of the rescue device 500 includes ultrasonic sensors or other means of detecting doorways, then display 522 could include, e.g., a doorway counter that is decremented as the rescuer 600 passes through each doorway.

Another possible feature is that of elapsed time, shown in bar 720 at the base of display 522. Bar 720 may include an indication of elapsed time of the video, e.g., 1 minute 37 seconds (1:37) and total length of video (2:07), along with current elapsed time (1:32). This can provide further information to the rescuer 600, namely knowing that he should reach the firefighter 300 in about 30 seconds. This timing information also provides the rescuer 600 a sense of whether what the rescuer is seeing at the moment coincides with what the firefighter 300 was seeing after a given moment in time. This may give the rescuer 600 more confidence that he is in fact following the correct path to reach firefighter 300.

Still another possible feature is that of an indication of a difference in speed between the firefighter 300 and the rescuer 600. This speed difference can be calculated by microprocessor 512 and displayed on display 522.

As further shown in FIG. 7, rescue device 500 may also include fast forward (FF) 706 and rewind (REW) 708 buttons, allowing rescuer 600 to fast forward or rewind the imagery being presented. Similarly, rescue device 500 may also include accelerate (ACC) 710 and decelerate (DEC) 712 buttons to control the speed at which the video imagery and associated indicia are played. For instance, it may be the case that the rescuer 600 is able to traverse the path 101 the firefighter 300 took much more quickly, and thus, the rescuer 600 need not necessarily follow the path at the same speed as the firefighter 300.

Figure 8:
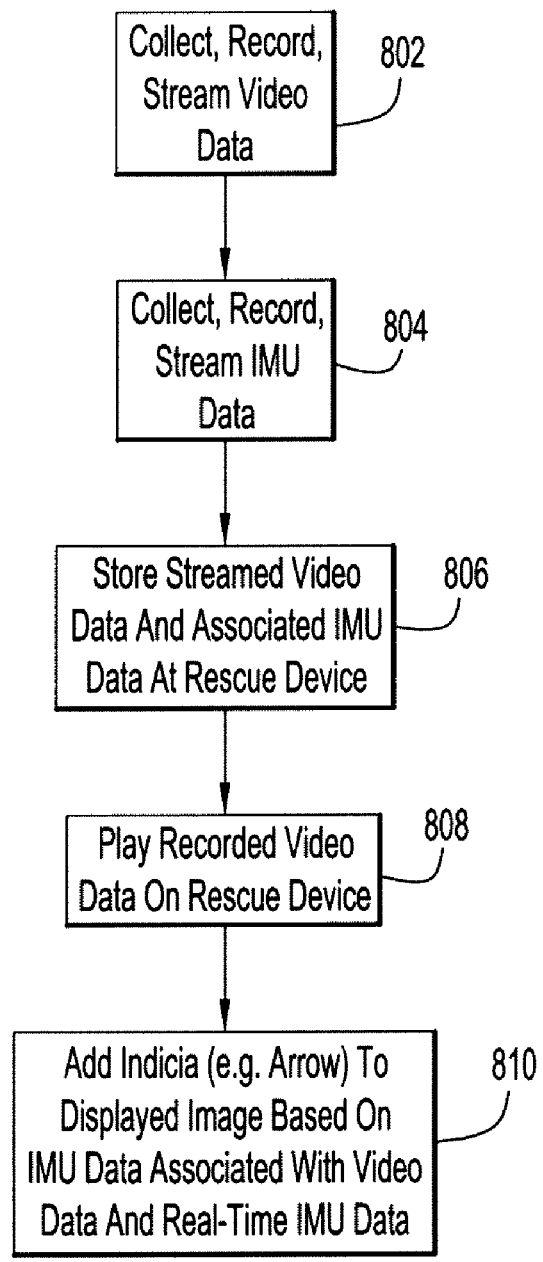
FIG. 8 illustrates an example process that is performed in accordance with an embodiment of the present invention.

FIG. 8 illustrates an example process that is performed in accordance with an embodiment of the present invention. At step 802, video data is collected, recorded (stored) and streamed to a base station 400 or rescue device 500. At substantially the same time, IMU data associated with the video data is collected, recorded and streamed to the same base station 400 or rescue device 500.

At step 806, the video data and IMU data associated with the video data are stored at the rescue device. At a later time, and at step 808, the video data is played on a display of the rescue device 500, and at step 810, which occurs substantially simultaneously with step 808, indicia are overlaid, superimposed or added next to the played video, where the indicia are indicative of, e.g., a direction of travel of a firefighter that took the video imagery, or a traversal path (e.g. through a doorway) of the firefighter 300.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method, comprising:
   collecting video data representative of a path of traversal of a user;

collecting inertial motion unit (IMU) data associated with the video data;

transmitting the video data and IMU data associated with the video data to a rescue device that includes a display; and subsequent to the transmitting step, replaying the video data on the display of the rescue device along with viewable indicia, based on the IMU data associated with the video data, that is indicative of motion of the user when the video data was collected.

2. The method of claim 1, further comprising displaying on the display an arrow indicative of a direction in which the user was moving when the video data was collected and recorded.

3. The method of claim 1, further comprising accelerating a replay speed of the video data and viewable indicia.

4. The method of claim 1, wherein the transmitting step comprises sending the video data and the IMU data associated with the video data wirelessly.

5. The method of claim 1, wherein the IMU data associated with the video data comprises at least one of speed data, acceleration data, direction data, or tilt data.

6. The method of claim 1, further comprising loading a plurality of rescue devices with the video data and IMU data associated with the video data.

7. The method of claim 1, further comprising synchronizing a video frame speed, during the step of collecting video data, with a speed of a user collecting the video data.

8. The method of claim 7, further comprising setting the video frame speed to a fixed frame rate.

9. The method of claim 1, further comprising calculating a difference in speed between a speed provided in the IMU data associated with the video data and a current speed of a user operating the rescue device.

10. The method of claim 1, further comprising displaying a measure of elapsed time of the video data being replayed, and of a time a rescuer is operating the rescue device.

11. A locating system, comprising:
a display;
an inertial motion unit (IMU) that is configured to generate real-time IMU data; and
a processor that is configured to receive the real-time IMU data along with video data and IMU data associated with the video data, and further configured to synchronize the real-time IMU data with the video data and IMU data associated with the video data such that indicia representative of the synchronization are displayed on the display when the video data is played.

12. The locating system of claim 11, wherein the display is part of a handheld computing device.

13. The locating system of claim 11, further comprising control buttons.

14. The locating system of claim 13, wherein the control buttons include fast forward and rewind.

15. The locating system of claim 11, wherein the system is configured to receive the video data and the IMU data associated with the video data from a base station.

16. The locating system of claim 15, wherein the video data and the IMU data associated with the video data are received wirelessly.

17. The locating system of claim 11, wherein the system calculates and displays a difference in direction between a user of the system and that of a person who collected the video data.

18. The locating system of claim 11, further comprising a camera and associated IMU.

19. The locating system of claim 18, wherein the camera is mounted to a helmet.

20. The locating system of claim 11, wherein the indicia comprises an arrow indicative of a direction of travel.

21. The system of claim 11, wherein the indicia comprises an indication that doorway has been passed through.

22. The system of claim 11, wherein the indicia comprises a measure of elapsed time.

23. The system of claim 11, wherein the indicia comprises an indication of a speed difference between a user of the system and that of a person who collected the video data.

24. A rescue apparatus, comprising:
a user device configured to collect and transmit video data and inertial motion unit (IMU) data associated with the video data; and
a rescue device configured to receive the video data and IMU data associated with the video data transmitted by the user device, to play the video data on a display, and further configured to present viewable indicia, based on the IMU data associated with the video data, that is indicative of the motion of a user when the video data was collected by the user device.

* * * * *